UNITED STATES PATENT OFFICE.

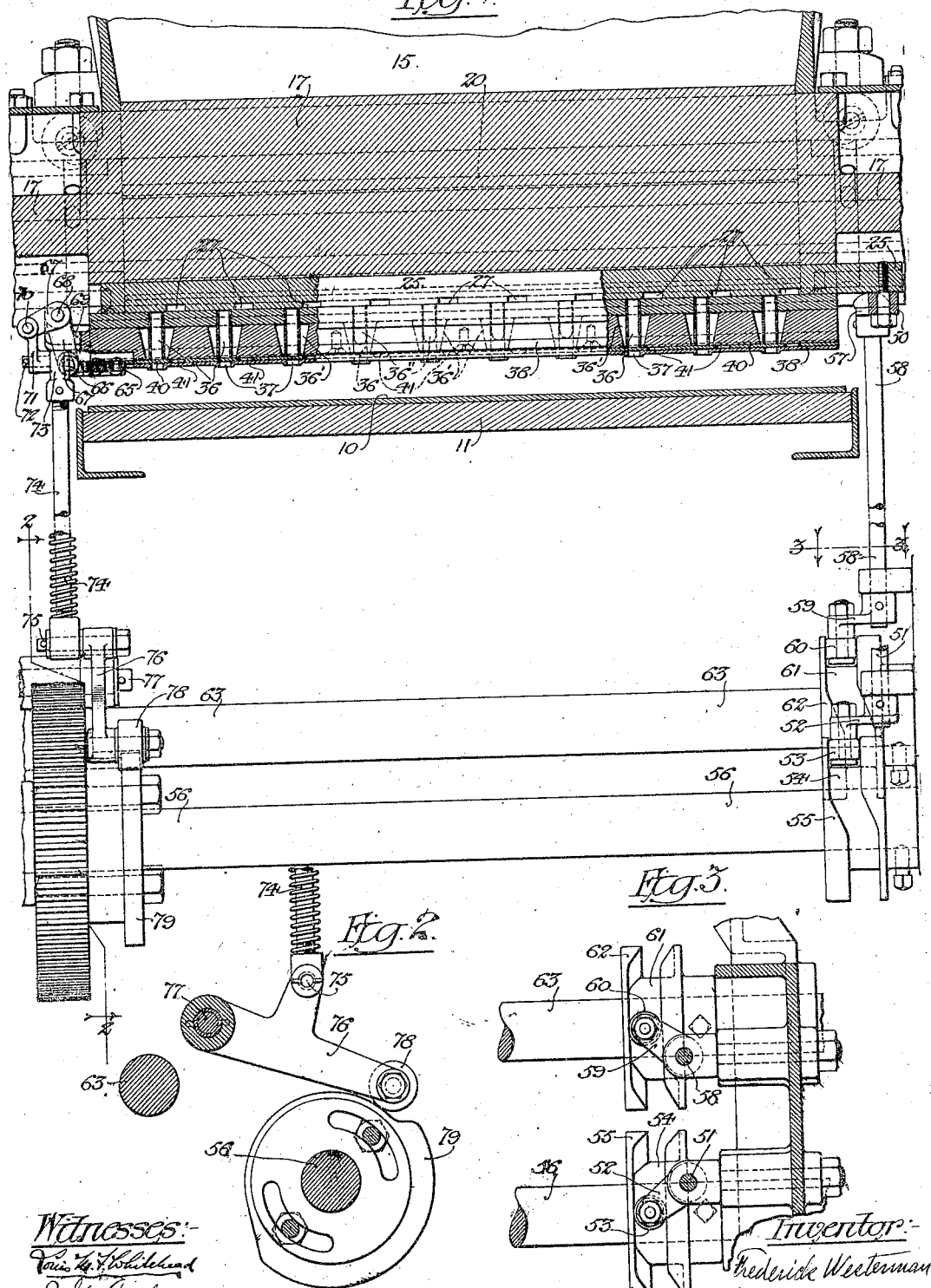

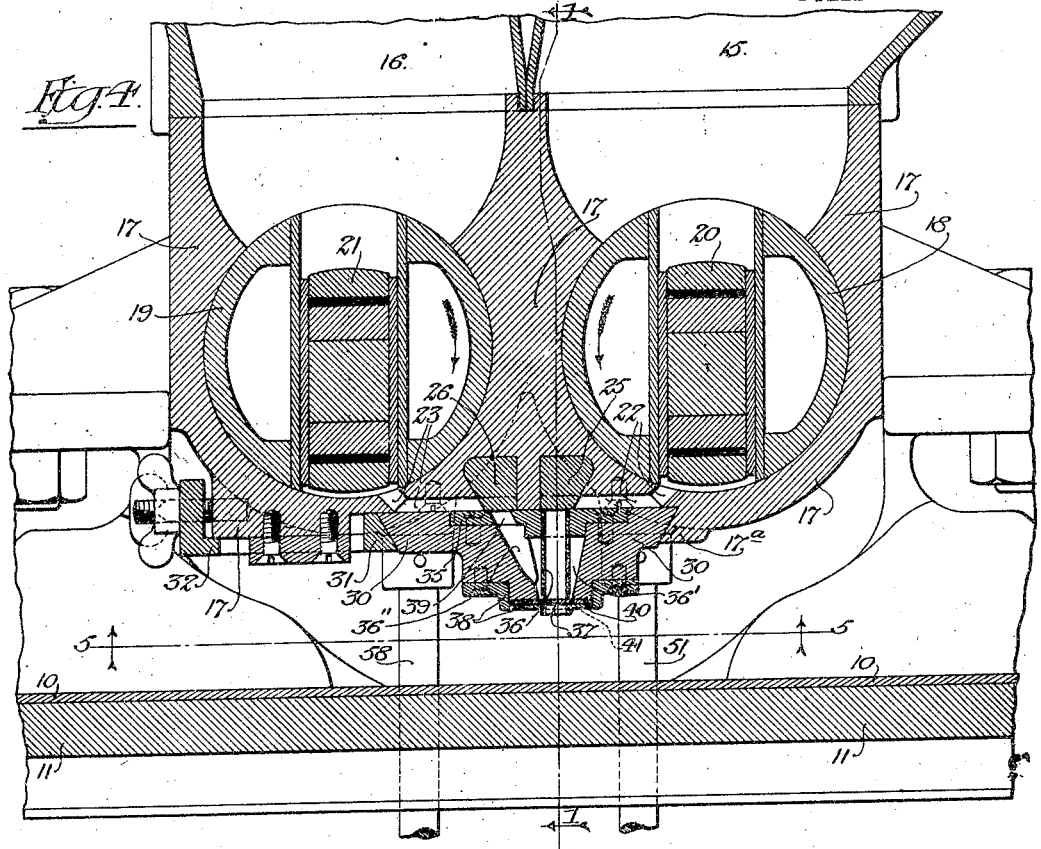

FREDERICK WESTERMAN, OF CHICAGO, ILLINOIS.

DEPOSITING-MACHINE.

1,121,432.  Specification of Letters Patent.  Patented Dec. 15, 1914.

Application filed February 7, 1914. Serial No. 817,311.

*To all whom it may concern:*

Be it known that I, FREDERICK WESTERMAN, a citizen of the United States, and a resident of Chicago, county of Cook, and State of Illinois, have invented certain new and useful Improvements in Depositing-Machines, of which I do declare the following to be a full, clear, and exact description, reference being had to the accompanying drawings, forming part of this specification.

The present invention has relation more particularly to that class of depositing machines especially designed for depositing marshmallow and other confection upon the upper surface of cakes that are fed in successive rows beneath the depositing mechanism. An example of this type of machine is set forth in an application for Letters Patent filed by me in the United States Patent Office May 29, 1911, Serial No. 630,268, and in an application filed in the Patent Office, December 20, 1913, Serial No. 807,851. Inasmuch as the mechanism for advancing the cakes or like material to receive the deposits of marshmallow or other confection is the same as in my last mentioned application, Serial No. 807,851, I have not deemed it necessary to illustrate the details of such mechanism in the accompanying drawings, my present invention relating simply to the means for controlling the flow of marshmallow and like confection that is to be deposited.

My invention consists in the features of novelty hereinafter described, illustrated in the accompanying drawings and particularly pointed out in the claims at the end of this specification.

Figure 1 is a view in vertical section on line 1—1 of Fig. 4. Fig. 2 is a detail view in vertical section on line 2—2 of Fig. 1. Fig. 3 is a detail view in horizontal section on line 3—3 of Fig. 1. Fig. 4 is an enlarged view in vertical cross-section through the center of Fig. 1. Fig. 5 is an inverted or bottom view of the depositing mechanism, parts being shown in section and parts being broken away.

10 designates the endless carrier that will be supported upon a vertically movable table 11, this carrier serving to intermittently move the rows of cakes upon the tops of which the deposits of marshmallow and chocolate or like confections will be made. The carrier belt and table may be actuated by the same mechanism as is illustrated in my before mentioned application Serial No. 807,851, or the cakes to be coated may be advanced beneath the depositing mechanism by any suitable means, as such means forms no part of my present invention.

Suitably supported above the carrier 10 by the main frame of the machine are the receptacles 15 and 16 that will contain, respectively, the marshmallow and chocolate or like confections that are to be deposited upon the cakes. Beneath the receptacles 15 and 16 is placed a casting 17 having cylindrical openings extending from end to end thereof, and within such cylindrical openings are mounted the two cylindrical plunger carriers 18 and 19. These plunger carriers 18 and 19 are provided respectively with plungers 20 and 21 by which, as the plunger carriers are rotated, the confections will be discharged through channels 22 and 23 leading through the lower part of the casting 17. The construction and function of the plunger carriers and the mechanism for operating them will be the same as in my before mentioned application, Serial No. 807,851, and need not therefore be more particularly described. From end to end of the lower part of the central portion of the casting 17 are formed dove-tailed channels or chambers within which are mounted, in manner free to reciprocate, the slide valves 25 and 26, these slide valves serving to control the passage of confection through the channels 22 and 23, respectively. Each of these slide valves 25 and 26 is formed with a series of channels 27 (see Fig. 5) the function of which will presently appear.

Beneath the central portion of the casting 17 extends a chambered casting 30, the longitudinal edges of which are preferably beveled to form a dove-tailed engagement with the flange 17ª and a corresponding beveled bar 31 formed at the inner side of an adjustable plate or casting 32. The means for retaining the chambered casting 30 in position beneath the casting 17 being the same as set forth in my application Serial No. 807,851, need not be more particularly described. Over the top of the chambered casting 30 extends a cover plate 35 that is held by screws within the recessed upper portion of the casting. In this cover plate 35 are formed a series of holes within which are fixed the upper ends of the delivery pipes 36 that extend downward through conical openings in the castings 30 and terminate a slight distance above a corresponding series of discharge openings 37 that are formed in the bottom plate 38 of the chambered casting 30. This bottom plate 38 is preferably a cast plate of angular shape, as shown in Fig. 4, and is united by screws to the casting 30. The upper ends of the delivery pipes 36 communicate with the channel 22 through which marshmallow will be delivered.

In the cover plate 35 of the casting 30 is formed a series of holes 39 that communicate with passage 36 and connect the annular passage 36' about the pipe 30 with the channel 23 through which chocolate or like confection will be forced. By reference to Fig. 4 it will be seen that the lower end of the delivery pipes 36 for marshmallow are smaller than the lower portion of the passages 36', so that the chocolate or like confection delivered into these passages will surround the lower ends of the delivery pipes 36. Beneath the casting 30 and between the bottom of this casting and the bottom plate 38 is mounted a slide valve 40 that is formed with a series of holes 41 corresponding in number and arrangement to the delivery pipes 36, and to the holes or discharge openings 37 in the bottom plate 38.

In Figs. 1 and 4 of the drawings, the upper valves 25 and 26 and the lower slide valve 40 are shown in closed position, that is to say, in position to cut off the passage of the material to be deposited. When these valves are open, marshmallow will be forced by the plunger 20 through the channel 22 and through the delivery pipes 36 onto the cakes to be coated and at the same time, chocolate or like confection will be forced by the plunger 21 through the channel 23, ports or openings 39, into the annular passages 36' and around the streams of marshmallow issuing through the discharge openings 37 of the bottom plate 38. The upper valves 25 and 26 are preferably arranged to close slightly in advance of the slide valve 40, so that the slide valve serves to cut off the stream of marshmallow and prevent the formation of any tail or "teat" at the top of the deposit, thereby leaving the same with a smooth upper surface that will be coated by the surrounding wall of chocolate.

The mechanism whereby the valves 25 and 26 within the slide valve 40 may be actuated will next be described. The mechanism for actuating the slide valves 25 and 26 is the same as the mechanism by which the corresponding valves are actuated in the machine set forth in my hereinbefore mentioned application, Serial No. 807,851. To one end of the valve 25 is connected a crank 50 secured to the upper end of a rod 51 and to the lower end of this rod 51 is secured a crank 52 through which passes a bolt carrying a roller 53 that sets within a cam groove 54 of a cam wheel 55 mounted on a shaft 56. Similarly, one end of the valve 26 is connected to a crank 57 at the upper end of the rod 58, the lower end of this rod being provided with a crank 59 through which passes a bolt provided with a roller 60 that travels in a cam groove 61 of a cam wheel 62 on the shaft 63. Hence, it will be seen that as the shafts 56 and 63 are rotated, as by the mechanism set forth in my above mentioned application, Serial No. 807,851, a reciprocating movement will be imparted to the valves 25 and 26.

To one end of the slide valve 40 (see Figs. 1 and 5) is fastened a yoke-shaped bar or casting 65 through the arms of which passes a pin 66 that is engaged by the yoke-shaped end of a bell crank 67 that is journaled on a pin 68 mounted on an arm 69 projecting from one end of the lower portion of the chambered casting 30. The opposite arm of the bell crank 67 has fixed thereto a pin 70 that passes through the upper end of an arm 71, the lower end of which is mounted upon a pin 72 projecting from a head 73 attached to the upper end of a rod 74. The lower end of the rod 74 is pivotally connected at 75 to a rocking arm 76 mounted upon a stud 77 projecting from the main frame of the machine. The free end of the rocking arm 76 carries a roller 78 that bears upon a cam wheel 79, adjustably mounted on the shaft 56 that will extend from side to side of the main frame, as in the machine set forth in my before mentioned application Serial No. 807,851. The rod 74 is encircled by a spring that serves to normally hold the roller at the end of the rocking arm 76 in engagement with the cam wheel 79.

From the foregoing description it will be seen that as the shaft 56 is rotated, the rocking arm 76 will be actuated by the cam wheel 79, thereby lifting the rod 74 and through the connections above described, this rod 74 imparts a reciprocating movement to the slide valve 40, causing the ports 41 of this slide valve to be moved back and forth beneath the discharge pipes 36. It will thus be seen that when the slide valve 40 is reciprocated, the passage of marshmallow and chocolate through the openings 39 of the bottom plate 38 will be cut off and this cutting off of the marshmallow and chocolate occurs so near to the surface of the cakes to be coated that a very smooth and even surface is given to the deposited materials.

It should be noted that the openings 37 form contracted discharge ports for the material passing through the pipe 36 and the annular passages 36', and these contracted discharge ports are arranged below the ends of the pipes so that the material forced through the annular passages 36' over the ends of the pipes will properly coat the material as it is delivered from the pipes, but the slide valve is arranged above the discharge orifices and against the ends of the pipes so that no excess of material can flow through the pipes. At the same time, the arrangement of the slide valve is such that it clears the contracted annular space about the end of each pipe so that there is no obstruction in the proper flow of the coating material therethrough.

Having thus described my invention, what I claim as new, and desire to secure by Letters Patent, is:—

1. In a depositing machine, the combination of a plurality of receptacles for containing the different materials to be deposited, of a part having a series of passages communicating with one of said receptacles and having contracted discharge orifices, a series of pipes connected with said receptacles, extending through said passages and terminating above said contracted orifices, and a slide valve operating against the ends of said delivery pipes and arranged to cut off the flow of material therethrough and through said passages.

2. In a depositing machine, the combination of a plurality of receptacles for containing different materials to be deposited, of a delivery pipe communicating with one of said receptacles, a part or casting having an annular passage about said delivery pipe and communicating with the other of said receptacles, a plate secured to said part or casting and having a discharge orifice for said annular passage and for said delivery pipe, and slide valve mechanism arranged between the lower end of said delivery pipe and said detachable plate and movable across the space about the end of said delivery pipe for simultaneously cutting off the flow of material through said pipe and through said passage.

3. In a depositing machine, the combination with a plurality of receptacles for containing different materials to be deposited, of a series of delivery pipes communicating with one of said receptacles, a part or parts having annular passages about said pipe and communicating with the other of said receptacles, means for intermittently withdrawing charges of material from said receptacles and for forcing the same through said delivery pipes and said passages, slide valve mechanism for controlling the flow of material at the upper ends of said delivery pipes and slide valve mechanism at the lower ends of said delivery pipes for simultaneously cutting off the flow of material through said pipes and said passages.

4. In a depositing machine, the combination with a plurality of receptacles for containing different materials to be deposited, of a series of delivery pipes communicating with one of said receptacles, a part or parts having annular passages about said pipe and communicating with the other of said receptacles, means for intermittently withdrawing charges of material from said receptacles and for forcing the same through said delivery pipes and said passages, and a slide valve operating against the ends of said delivery pipes and having a series of perforations therein which, in the opening position of the valve, register with said pipes and said annular passages.

5. In a depositing machine, the combination with a plurality of receptacles for containing different materials to be deposited, of a series of delivery pipes communicating with one of said receptacles, a casing about said pipes having a series of annular passages communicating with the other of said receptacles, a removable bottom plate for said casing having openings therein that form the discharge orifices of said pipes and said annular passages, said plate being spaced at a slight distance from the lower ends of said pipes, and valve mechanism between said bottom plate and the lower ends of said delivery pipes for simultaneously cutting off the flow of material through said pipes and said passages.

FREDERICK WESTERMAN.

Witnesses:
 GEO. P. FISHER,
 J. G. ANDERSON.